(12) United States Patent
Atkinson

(10) Patent No.: US 9,507,709 B2
(45) Date of Patent: Nov. 29, 2016

(54) HIBERNATION BASED ON PAGE SOURCE

(75) Inventor: Lee Warren Atkinson, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 62 days.

(21) Appl. No.: 14/391,226

(22) PCT Filed: May 29, 2012

(86) PCT No.: PCT/US2012/039806
§ 371 (c)(1),
(2), (4) Date: Oct. 8, 2014

(87) PCT Pub. No.: WO2013/180688
PCT Pub. Date: Dec. 5, 2013

(65) Prior Publication Data
US 2015/0067241 A1    Mar. 5, 2015

(51) Int. Cl.
| G06F 12/00 | (2006.01) |
| G06F 12/02 | (2006.01) |
| G06F 9/44 | (2006.01) |
| G06F 12/10 | (2016.01) |

(52) U.S. Cl.
CPC ......... *G06F 12/0246* (2013.01); *G06F 9/4418* (2013.01); *G06F 12/1009* (2013.01); *G06F 2212/2022* (2013.01)

(58) Field of Classification Search
None
See application file for complete search history.

(56) References Cited

U.S. PATENT DOCUMENTS

| 6,609,182 B1 | 8/2003 | Pedrizetti et al. |
| 6,694,451 B2 | 2/2004 | Atkinson |
| 7,519,808 B2 | 4/2009 | Reece |
| 7,765,328 B2 | 7/2010 | Bryers et al. |
| 8,018,771 B2 | 9/2011 | Maccarrone et al. |
| 8,069,360 B2 | 11/2011 | Yamaji et al. |
| 2002/0087816 A1* | 7/2002 | Atkinson ............. G06F 12/08 711/156 |
| 2009/0313416 A1 | 12/2009 | Nation |
| 2009/0327608 A1 | 12/2009 | Eschmann et al. |
| 2010/0211750 A1 | 8/2010 | Yamauchi |
| 2013/0159599 A1* | 6/2013 | Bar-Or ............. G06F 9/4418 711/103 |
| 2013/0166852 A1* | 6/2013 | Lo .................. G06F 9/4418 711/154 |
| 2013/0212317 A1* | 8/2013 | Traister ............. G06F 12/0871 711/103 |

FOREIGN PATENT DOCUMENTS

| CN | 1662869 | 8/2005 |
| CN | 102163151 | 8/2011 |

OTHER PUBLICATIONS

International Search Report and Written Opinion received in PCT Application No. PCT/US2012/039806, mailed Feb. 21, 2013, 8 pages.

* cited by examiner

*Primary Examiner* — Daniel Tsui

(74) *Attorney, Agent, or Firm* — HP Inc. Patent Department

(57) ABSTRACT

Example embodiments disclosed herein relate to hibernation. A device includes a non-volatile memory including a solid state memory and a volatile memory. The volatile memory includes a plurality of pages. One or more of the pages are caused to be stored to non-volatile memory based on whether the respective pages are sourced from the solid state memory.

9 Claims, 3 Drawing Sheets

HIBERNATION BASED ON PAGE SOURCE

BACKGROUND

Manufacturers of computing devices are challenged to deliver quality and value to consumers, for example by providing a responsive computing device. Many computing devices include a hibernation mode that allows the computing device to power down while retaining its state. During hibernation, a computer saves the contents of its volatile memory to a hard disk. Upon resumption, the computer is in the state it was when entering hibernation.

BRIEF DESCRIPTION OF THE DRAWINGS

The following detailed description references the drawings, wherein.

DETAILED DESCRIPTION

Figure 1B:
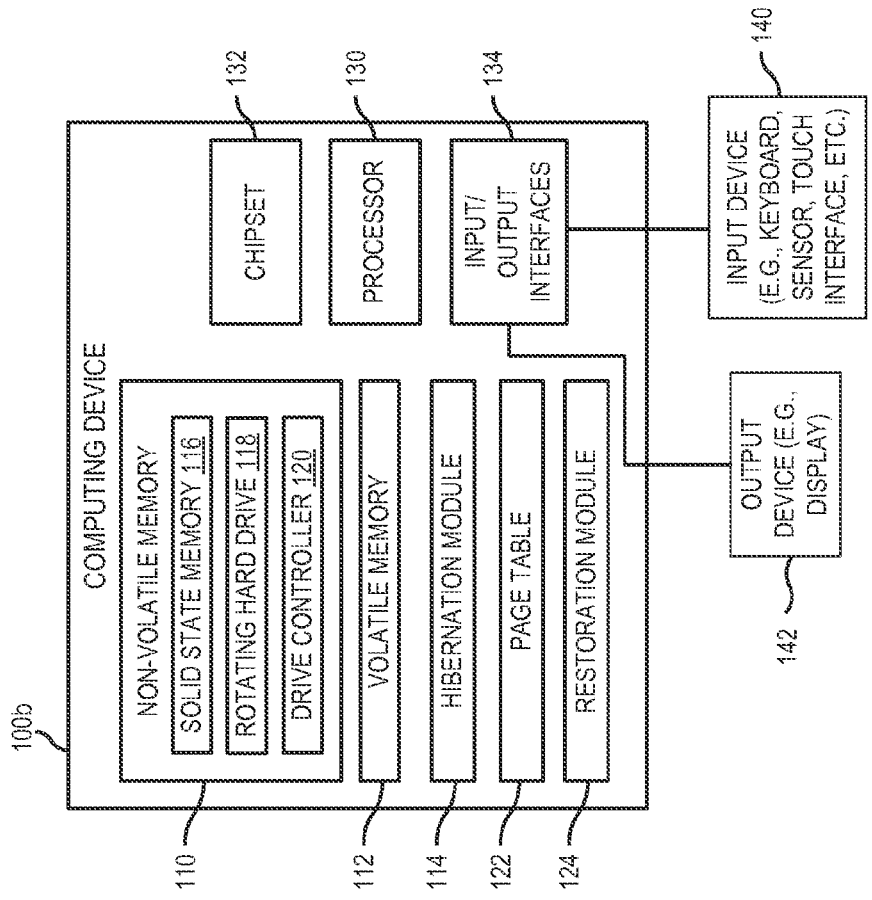
FIGS. 1A and 1B are block diagrams of computing devices capable of performing hibernation by storing one or more pages of volatile memory in a hibernation file based on whether the source of the respective pages is solid state memory, according to various examples.

Many computing devices today include a hibernation mode. Hibernation is an approach for powering down a computing device while retaining its state. An example of a hibernation state is the Advanced Configuration and Power Interface (ACPI) S4 state. During a typical hibernation, the computing device saves the contents of volatile memory, for example, random access memory (RAM), to a non-volatile storage, such as a hard disk drive. When power is once again applied to the computing device, the contents of the volatile memory saved on the non-volatile storage are restored.

However, users of computing devices desire quicker response during the save and resume processes. The amount of time required for a hibernation save and/or a hibernation resume can increase or decrease based on the amount of content saved. As such, saving less information can reduce the amount of time used for saving and/or resuming. In hibernation, the value of a hibernation file (e.g., the information saved to non-volatile storage) was to create a bookmark of the slate of the computing device, and to do so by using a defragmented portion of a rotating hard drive. However, with solid state memory, such as NAND storage, NOR storage, etc., fragmentation that led to seek time penalties for rotating media are reduced so placement of RAM contents into a contiguous block does not expedite the resume process when data is already placed on solid state storage.

Accordingly, various embodiments disclosed herein relate to selectively generating a hibernation file based on whether an associated page in volatile memory is sourced from a particular type of storage device. In certain examples, the speed of the storage device is taken into account. A map is kept such that a non-volatile source for each page stored in volatile memory is identified. If the data came from a solid state storage or was cached in a solid state storage, the operating system can identify the source of the data as a particular category, for example, faster than a hard disk drive. If a page sourced from solid state memory has been unmodified, for example by being marked as read only, when a hibernation event starts, the operating system can treat the page in a special way.

In one example, the page can be voided by eliminating it from a page table and is not stored in the hibernation file. Subsequent access to the page can cause a global page fault and the operating system can reload the page from the non-volatile memory. The operating system can use a virtual memory management system to determine the location of the requested page on non-volatile memory.

In another example, the page is not included in the hibernation file, but is not deleted from the page table. The operating system can de-prioritize the restoration of the data marked as being stored in the solid state storage. As such, the hibernation file would first be loaded to the volatile memory while the rest of the pages in the page table that are stored in solid state storage are restored in the background. With these approaches, duration for hibernation to and from a disk is improved.

As used herein, a page table is a data structure that is used to store mapping between virtual addresses and physical addresses. As noted above, the page table can include additional information, such as source information, validity information, or the like. The page table can also be part of a system page table. In one embodiment, a system page table is a complete list of pages with valid contents used by the computing device. Examples of data structures for a page table include inverted page tables and hashed page tables.

Figure 1A:
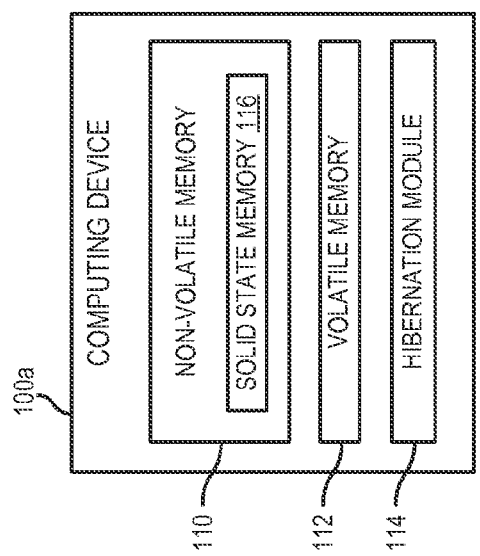

FIGS. 1A and 1B are block diagrams of computing devices capable of performing hibernation by storing one or more pages of volatile memory in a hibernation file based on whether the source of the respective pages is solid state memory, according to various examples. Computing devices 100a, 100b may be a notebook computer, a desktop computer, a tablet computing device, a wireless device, a server, a workstation, or any other computing device that can perform hibernation based on a type of memory that volatile memory is sourced from. In one example, computing device 100a includes non-volatile memory 110, volatile memory 112, and a hibernation module 114. In this example, the non-volatile memory can include solid state memory 116, a rotating hard drive 118, and/or a drive controller 120. In another example, computing device 100b may further include a page table 122, a restoration module 124, a processor 130, a chipset 132, and input/output interfaces 134.

The computing device 100 includes a volatile memory 112. In certain examples, the volatile memory 112 is a computer storage that requires power to maintain stored information. Examples of volatile memory 112 include RAM such as Dynamic RAM (DRAM), Synchronous DRAM (SDRAM), and Double Data Rate (DDR) SDRAM, read/write memory, etc. Volatile memory 112 can be faster than non-volatile memory 110.

In certain embodiments, non-volatile memory 110 is computer storage that can retain stored information when not powered. Examples of non-volatile memory 110 include flash memory, ferroelectric RAM (F-RAM), hard disk drives, solid state drives, etc. As such, the non-volatile memory 110 can include a rotating hard drive 118, a solid state memory 116, or a combination thereof. In one example, the non-volatile memory 110 can be a hybrid hard drive that includes a rotating hard drive 118 with a rotating platter along with solid state memory 116. In certain examples, in a hybrid hard drive implementation, the solid state memory 116 can act as a cache. A drive controller 120 or a processor 130 (for example, via a Serial Advanced Technology Attachment (SATA) Frame Information Structure (FIS)) can be used to implement the cache using one or more algorithms, for example, using a Smart Response Technology (SRT) implementation. The solid state memory 116 can be located on the same physical package as the rotating hard drive 118 and/or drive controller 120 or on a separate package.

The rotating hard drive 118 can include storage based on a technology that uses rapidly rotating discs (platters) coated with magnetic material to store information. A magnetic head can be used to read and/or write data to the surfaces. Access time for reading and/or writing to the rotating hard drive 118 can include a seek time which measures how long it takes the magnetic head to travel to a track on a platter that includes the data as well as rotational latency that occurs because the desired disk sector may not be under the magnetic head when a data transfer is requested.

Solid state memory 116 does not use rotating platters to store information. As such, solid state memory 116 has lower access time and/or latency. Solid state memory 116 can be implemented using various memory technologies, such as flash memory, for example, NAND flash memory and NOR flash memory, memristor technology, phase change memory, or the like.

Volatile memory 112 can store digital information used by the processor 130. The volatile memory 112 can include multiple pages of memory. In certain examples, a page is a fixed-length contiguous block of virtual memory that is the smallest unit of data for transfer between the volatile memory 112 and any other storage, such as the non-volatile memory 110.

Pages can be tracked by a page table 122. In certain examples, a page table 122 is a data structure used by virtual memory of the computing device 100 to store the mapping between virtual addresses and physical addresses (for example, the physical location in volatile memory 112 or non-volatile memory 110). During execution of programs, non-volatile memory 110 can be placed into volatile memory 112. For example, instructions of a program or information from a file on the non-volatile memory 110 can be placed into volatile memory 112. The page table 122 can include information about a swap file that can be stored on the non-volatile memory 110. The page table 122 may also include information about whether particular pages currently in the volatile memory 112 are sourced from solid state memory 116. In certain examples, being sourced from solid state memory 116 means that the page in volatile memory 112 is read from a copy of the page stored on the solid state memory 116. In some examples, the sourced page can be considered read only in the volatile memory 112 and/or unmodified. Further, the page table 122 tracks the pages. In one example, the page table 122 includes a source register for each of the pages. The source register can indicate whether the respective page is sourced from a first memory type, such as from solid state memory 116, or another memory type, such as a rotating hard drive 118. The page table 122 can also include a validity register for each of the pages. The validity register can indicate whether respective pages are valid in the volatile memory 112.

A hibernation module 114 can be used to put the computing device 100 into a hibernation state. In certain embodiments, a hibernation state is a state where the computing device 100 saves the contents of its volatile memory 112 to non-volatile memory 110 in a manner such that the computing device 100 can resume functionality once resumed. During the hibernation process, power can be removed from the volatile memory 112, causing the volatile memory 112 to lose stored information. The use of the computing device 100 can later be resumed using a restoration module 124.

Before hibernation, when the processor 130 of the computing device 100 attempts to access a logical or virtual address in memory and that memory data has not yet been copied from a non-volatile memory 110 such as the solid state memory 116 or rotating hard drive 118, a fault is generated that calls for a page of memory to be read from the non-volatile memory 110 and stored into volatile memory 112. The page table 122 for that memory segment can be validated to indicate that the page is stored in volatile memory 112. The source of the non-volatile memory 110 can be identified as coming from rotating media or from non-volatile solid state memory. As noted, a record of the source can be placed in a source register of the page table 122. In one example, a '0' can reflect that the page was sourced from rotating media while a '1' can indicate the page originated from solid state memory. Other states can also be reflected, for example, a '01', '11', '001', etc. to reflect other source information, for example, if multiple non-volatile memory types or devices are used. Further, in certain scenarios, when the content in volatile memory 112 is changed, the source register can be reset, set to null, or the like.

When placing the computing device 100 in a hibernation mode, the hibernation module 114 can cause storage of one or more of the pages in volatile memory 112 based on whether a copy of the respective pages is sourced from the solid state memory 116. As noted above, a page is sourced from the solid state memory 116 if the page in volatile memory 112 is a copy of the corresponding page on the solid state memory 116. Pages that are not sourced from the solid state memory 116 can be stored in a hibernation file. For example, pages sourced from a rotating hard drive 118 or other slower storage can be stored in the hibernation file. The pages sourced from the solid state memory 116 need not be stored in the hibernation file. This is because the extra overhead of retrieving content from the rotating hard drive 118 is not required for retrieving content from solid state memory 116. Because less pages are stored in the hibernation file, the size of the file is smaller and it hibernation/restore of the computing device 100 is quicker than if each page is saved to the hibernation file.

Further, in one scenario, the pages referenced in the page table 122 can be stored based on whether the respective pages are valid in volatile memory 112. In certain scenarios, the pages are valid while stored in volatile memory 112. During the hibernation process, pages that are sourced from solid state memory 116 can be invalidated in the page table 122 so that the information is not saved in the hibernation file. In other scenarios, the pages sourced from solid state memory 116 are not invalidated, but storing of the respective pages can be based on the source register. Invalid or unused portions of the volatile memory 112 need not be saved to the hibernation file, further speeding the hibernation/restore processes. In one example, pages from volatile memory 112 are stored in the hibernation file based on a determination that the respective pages are valid and its respective source register(s) indicate(s) that the respective pages were not sourced from solid state memory 116. This could mean that the respective pages were sourced from a rotating hard drive 118, were modified in a manner such that an equivalent copy is not stored on the solid state memory 116, or came from another location (for example, an input/output device). Moreover, the hibernation module 114 can store the page table with the hibernation file. Further, during the hibernation process, the volatile memory 112 can be cleared, for example, when power is removed from the volatile memory 112.

The computing device 100 can then be resumed from its hibernated state. This can be initiated, for example, using a button on the computing device 100. The restoration module 124 can read the page table from the hibernation file. The restoration module 124 can then place each valid page from the hibernation file into the volatile memory 112. In one example, the valid pages do not include pages sourced from the solid state memory 116. When the processor 130 attempts to read one of these pages that is sourced from the solid slate memory 116, but not copied to volatile memory 112, an operating system virtual memory management system, page director, etc. and the page table entries can recognize that the memory page is not valid in the volatile memory 112 and cause retrieval from the solid state memory 116.

In another example, pages stored in the hibernation file are restored in to the volatile memory 112 and then pages that were sourced from the solid state memory 116 can be copied to the volatile memory 112. The copying of the solid state memory 116 can occur as a background process and/or as a de-prioritized process that can occur while execution of the computing device 100 is turned over to an operating system from the restoration module 124. In this example, the hibernation file can include pages of the volatile memory 112 that are not stored on the solid state memory 116, for example, pages stored on the rotating hard drive 118 or not stored on non-volatile memory 110. This can be accomplished by basing what pages are stored in the hibernation file based on the source register associated with the respective pages. In this scenario, the page table 122 includes the pages stored on the solid state memory 116. During restore, the pages that are saved in the hibernation file are placed/copied into the volatile memory 112. Then, the pages stored on the solid state memory 116 can be copied in the background. The restoration module 124 can read the page table 122 and distinguish between files sourced from solid state memory 116 to determine which pages are copied via the de-prioritized process.

A processor 130, such as a central processing unit (CPU) or a microprocessor suitable for retrieval and execution of instructions and/or electronic circuits can be configured to perform the functionality of any of the modules 114, 124 described herein. In certain scenarios, instructions and/or other information, such as content, can be included in volatile memory 112 or other memory. Input/output interfaces 134 may additionally be provided by the computing device 100b. For example, input devices 140, such as a keyboard, a sensor, a touch interface, a mouse, a microphone, etc. can be utilized to receive input from an environment surrounding the computing device 100b. Further, an output device 142, such as a display, can be utilized to present information to users. Examples of output devices include speakers, display devices, amplifiers, etc. Moreover, in certain embodiments, some components can be utilized to implement functionality of other components described herein.

Each of the modules 114, 124 may include, for example, hardware devices including electronic circuitry for implementing the functionality described herein. In addition or as an alternative, each module 114, 124 may be implemented as a series of instructions encoded on a machine-readable storage medium of computing device 100 and executable by processor 130. It should be noted that, in some embodiments, some modules are implemented as hardware devices, while other modules are implemented as executable instructions.

As noted, in some embodiments, the non-volatile memory 110 can be a hybrid hard drive. A hybrid hard drive can include at least one platter of rotating media such as a rotating hard drive 118 as well as solid state memory 116, for example, NAND memory, and a storage controller such as drive controller 120. The processor 130 can be connected to a chipset 132. The chipset 132 can be a bridge between the processor 130 and volatile memory 112, and the drive controller 120. A SATA bus or another type of bus can connect the storage controller to the hybrid hard drive.

The solid state memory 116 can act as cache for the rotating hard drive 118. Conventional methods of caching can be used. Further, the physical size of the cache can be smaller than the rotating media. The drive controller 120 can execute instructions to identify a priority of data stored on the rotating hard drive 118. A subset of the data from the rotating hard drive 118 can be stored in the solid state memory 116. When the processor 130 determines to access data from the hybrid hard drive, the drive controller 120 determines if the data is in the solid state cache before accessing the rotating hard drive. When data is located on the solid state cache, the access time is reduced. As noted above, SRT methods can be used to implement caching.

In certain embodiments, information distinguishing the source of the information as solid state memory 116 or information from rotating media can be reported by the drive controller 120 over the bus. The processor 130 can attempt to read a memory location that is not valid in volatile memory 112. Page table entries can recognize that the memory page is not valid in the volatile memory 112, causing access of the hybrid drive to retrieve the data. The drive controller 120 can respond to the processor 130 access with both the requested data and information about the source. The information about the source can be reported via a Frame Information Structure (FIS) or other communication mechanism. The processor 130 can receive the data and fill the volatile memory 112 with the page. The processor 130 can also set a present or valid bit in a page table entry. Further, the processor 130 can read source information embedded in the FIS and can set the page table entry corresponding to the page frame address that is associated with the data with the source information.

In one example, the non-volatile memory 110 is a solid state drive that includes the solid state memory 116. In this scenario, the source register can mark pages as being sourced from the solid state memory 116 or not being sourced from the solid state memory. Pages not sourced from solid state memory 116 can include, for example, pages that were created from processes executing in volatile memory 112. Because these pages are not sourced from the solid state memory 116, when hibernation occurs, the pages not sourced from the solid state memory 116 are stored in the hibernation file. During restore, information from the hibernation file can be copied into volatile memory 112 and, as discussed, other approaches can be used to restore the information sourced from the solid state memory 116.

Figure 2:
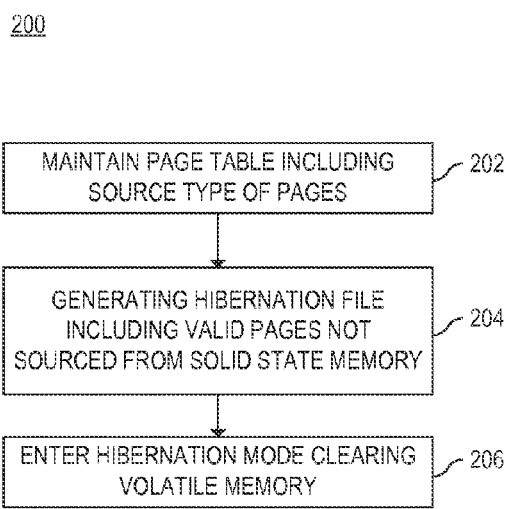
FIG. 2 is a flowchart of a method for generating a hibernation file that includes a set of pages of volatile memory that are not sourced from solid state memory, according to one example.

FIG. 2 is a flowchart of a method for generating a hibernation file that includes a set of pages of volatile memory that are not sourced from solid state memory, according to one example. Although execution of method 200 is described below with reference to computing device 100, other suitable components for execution of method 200 can be utilized (e.g., computing device 400). Additionally, the components for executing the method 200 may be spread among multiple devices or enclosures. Method 200 may be implemented in the form of executable instructions stored on a machine-readable storage medium and/or in the form of electronic circuitry.

Method 200 may start at 202, where computing device 100 may be on and maintain a page table including the source type associated with pages in volatile memory. In one example, the source type can be from a first type of memory such as a solid state memory or not the first type of memory, such as a second type of memory like a rotating hard drive. As such, the page table can indicate, for each of the pages, whether the respective page is sourced from a solid state memory and/or whether the respective page is valid. The page table can also perform conventional page table duties, such as, providing a mapping of virtual address space to physical address space.

During the course of use of the computing device 100, the computing device 100 can go into a low powered hibernation state using a hibernation process. At 204, a hibernation module generates a hibernation file that includes a set of the pages in volatile memory that is valid and not sourced from solid state memory. This can include pages that are sourced from hard drives, pages modified and/or created in non-volatile memory, or the like. The hibernation file can also include the page table to enable restoration from hibernation state. The hibernation file can be stored on non-volatile memory, such as a rotating hard drive or solid state drive. Then, at 206, the computing device 100 can enter a hibernation mode. The process to enter the hibernation mode can clear the volatile memory by removing power from the volatile memory.

Figure 3:
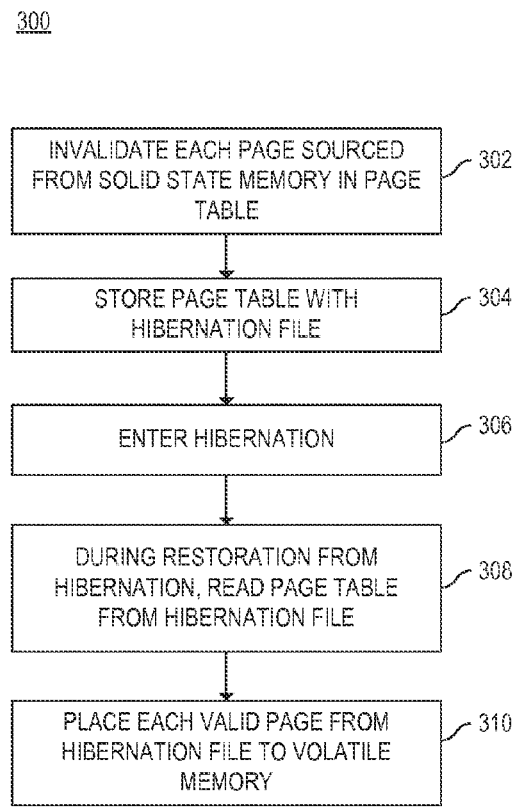
FIG. 3 is a flowchart of a method for restoring a computing device from hibernation, according to one example.

FIG. 3 is a flowchart of a method for restoring a computing device from hibernation, according to one example. Although execution of method 300 is described below with reference to computing device 100, other suitable components for execution of method 300 can be utilized (e.g., computing device 400). Additionally, the components for executing the method 300 may be spread among multiple devices or chassis. Method 300 may be implemented in the form of executable instructions stored on a machine-readable storage medium, and/or in the form of electronic circuitry.

Method 300 may start in a state where the computing device 100 is running. The computing device 100 can be triggered to go into a hibernation state. To get to the hibernation state, a hibernation process can control a page table of the computing device. At 302, the hibernation process can cause invalidating the validity of each of the pages in memory that are sourced from solid state memory in the page table. At 304, the page table is stored with the hibernation file. In certain examples, the page table can be stored as a separate file. In other examples, the page table can be included as part of the hibernation file. At 306, the computing device 100 enters a hibernation mode or state. As such, the volatile memory is cleared.

The computing device 100 can then be activated. Upon activation, the computing device 100 can go through a restoration process. As such, the computing device 100 can determine to restore the device from the hibernation mode. This can be due to a trigger during boot of the computing device 100 to restore from hibernation. An example of such a trigger is a flag set during hibernation. At 308, during restoration from hibernation, the page table is read from the hibernation file and/or another file. The page table can be used to restore the device to a state equivalent to the state the computing device 100 was in before hibernation. In certain examples, an equivalent state is a state that can function in the same manner as the state before hibernation. Further, at 310, the computing device can place each valid page from the hibernation file into the volatile memory. In some examples, a page is valid if it is stored in the hibernation file.

In certain examples, the volatile memory will have page faults for segments of memory that are stored on the solid state memory and not restored using the hibernation file. In one example, an equivalent state can include the use of page faults to trigger the reading of information stored on a solid state memory to volatile memory. In another example, the page table can be used to read memory locations of information that was not stored in the hibernation file. As a background process, the computing device 100 can restore the state of the computing device by reading pages that were valid and sourced from solid state memory from the solid state memory to the volatile memory.

Figure 4:
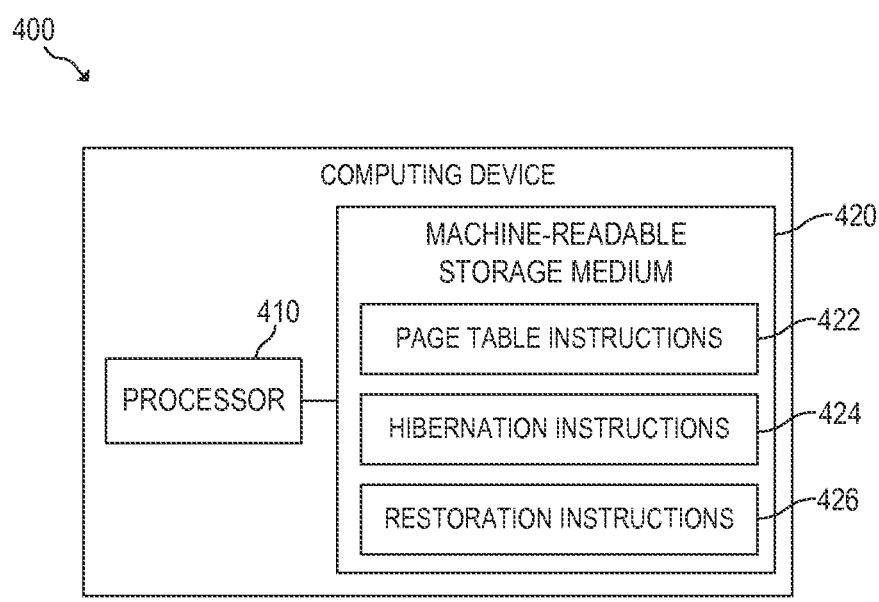
FIG. 4 is a block diagram of a device capable of generating a hibernation file that includes a set of pages that are not sourced from solid state memory, according to one example.

FIG. 4 is a block diagram of a device capable of generating a hibernation file that includes a set of pages that are not sourced from solid state memory, according to one example. The computing device 400 includes, for example, a processor 410, and a machine-readable storage medium 420 including instructions 422, 424, 426 for an improved hibernation/restore process. Computing device 400 may be, for example, a notebook computer, a slate computing device, a portable reading device, a wireless email device, a mobile phone, a workstation computer, or any other computing device.

Processor 410 may be, at least one central processing unit (CPU), at least one semiconductor-based microprocessor, at least one graphics processing unit (GPU), other hardware devices suitable for retrieval and execution of instructions stored in machine-readable storage medium 420, or combinations thereof. For example, the processor 410 may include multiple cores on a chip, include multiple cores across multiple chips, multiple cores across multiple devices (e.g., if the computing device 400 includes multiple node devices), or combinations thereof. Processor 410 may fetch, decode, and execute instructions 422, 424, 426 to control the computing device 400 as well as control hibernation of the computing device 400. As an alternative or in addition to retrieving and executing instructions, processor 410 may include at least one integrated circuit (IC), other control logic, other electronic circuits, or combinations thereof that include a number of electronic components for performing the functionality of instructions 422, 424, 426.

Machine-readable storage medium 420 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail herein, machine-readable storage medium 420 may be encoded with a series of executable instructions for causing hibernation and/or restoration of the computing device 400 from hibernation.

Page table instructions 422 can be used to maintain a page table for a plurality of pages stored in volatile memory of the computing device 400. The page table can perform customary page table functions, such as storing mappings of virtual addresses to physical addresses. Further the page table can indicate, for each of the pages, whether the respective page is sourced from solid state memory and/or whether the respective page is valid. In certain examples, a page is set to valid when it is sourced from a non-volatile memory and/or when the page is otherwise used to store information. The page can be marked as invalid at a later point, for example, if the information is no longer valid, no longer useful, the program accessing the information shuts down use of the information or the program itself is shut down, or the like.

The hibernation instructions 424 can be used to determine to put the device into a hibernation mode. In some examples, this can be controlled or initiated by an operating system executing on the computing device 400. The hibernation instructions 424 can execute on the processor 410 to generate a hibernation file that includes a set of pages in the volatile memory that are valid and not sourced from solid state memory. This hibernation file can be stored on non-volatile storage such as a rotating hard drive or a solid state memory.

In one example, during the hibernation process, the hibernation instructions 424 can cause changes to the page table. The pages sourced from solid state memory can be invalidated in the page table. This can be based on a source register associated with each page. The page table can also be stored with the hibernation file, for example, as a part of the hibernation file or as another file that can be accessed by the processor 410 during restoration to the hibernated state.

The computing device 400 can determine to restore the device from the hibernation mode, for example on boot. During restoration, restoration instructions 426 can be executed on the processor 410. The processor 410 can read the page table associated with the hibernation file. Each valid page from the hibernation file can be copied or placed into volatile memory.

As noted above, in one example, pages that were sourced from the solid state memory can be invalidated in the page table. As such, during restoration, the pages sourced from solid state memory are not copied to volatile memory, instead, the processes executing on the computing device 400 can wait until the page is attempted to be used, causing a fault that causes the page to be read from the solid state memory and stored in volatile memory.

In another example, the pages from the solid state memory are not abandoned. Instead, the locations of the pages in solid state memory can be pointed to in the page table or using a virtual memory management system of the operating system. The pages may be restored after the hibernation file is restored. Further, the pages can be restored in the background.

Moreover, though various embodiments disclosed herein refer to solid state memory and rotating hard drives, similar approaches are contemplated between first non-volatile storage devices that are faster by an order of magnitude than a concurrently used second non-volatile storage devices.

What is claimed is:

1. A computing device comprising:
   non-volatile memory including a solid state memory;
   volatile memory to include a plurality of pages, wherein a set of the pages is also stored on the solid state memory;
   a page table that tracks the pages, wherein the page table includes a source register for each of the pages that indicates whether the respective page is sourced from the solid state memory, wherein the page table further includes a validity register for each of the pages that indicates whether the respective page is valid, and wherein during a hibernation process, if the page table indicates that the respective page is stored on the solid state memory, the respective validity register for the respective page is invalidated; and
   a hibernation module to cause storage of one or more of the pages to the non-volatile memory if the respective pages are not sourced from the solid state memory, wherein the one or more pages are stored in a hibernation file, and wherein the one or more pages are stored based on a determination that the respective one or more pages are valid and the respective source register indicates that the respective one or more pages are not sourced from the solid state memory.

2. The computing device of claim 1, wherein the page table is stored with the hibernation file, and wherein the volatile memory is cleared.

3. The computing device of claim 2, further comprising:
   a restoration module to read the page table from the hibernation file, and wherein the restoration module places each valid page from the hibernation file into the volatile memory.

4. The computing device of claim 1, wherein the one or more pages are stored in a hibernation file, the computing device further comprising:
   a restoration module to read the page table, wherein the restoration module places each page from the hibernation file into the volatile memory, and wherein the restoration module places each page stored on the solid state memory into the volatile memory on a de-prioritized basis based on the respective source register associated with the respective pages.

5. The computing device of claim 4, wherein the solid state memory includes at least one of NAND flash memory, NOR flash memory, memristor, and phase change memory, and wherein the non-volatile memory is a hybrid hard drive including a rotating hard drive with at least one platter and the solid state memory.

6. A non-transitory machine-readable storage medium storing instructions that, if executed by at least one processor of a device, cause the device to:
   maintain a page table for a plurality of pages stored in a volatile memory, wherein the page table indicates, for each of the pages, whether the respective page is sourced from solid state memory, and whether the respective page is valid;
   invalidate for each of the pages sourced from solid state memory, the validity of the page in the page table;
   determine to put the device into a hibernation mode;
   generate a hibernation file that includes a set of the pages that are valid and not sourced from solid state memory; and
   store the page table with the hibernation file.

7. The non-transitory machine-readable storage medium of claim 6, further comprising instructions that, if executed by the at least one processor, cause the device to:
   determine to restore the device from the hibernation mode;
   read the page table from the hibernation file; and
   place each valid page from the hibernation file into the volatile memory.

8. A method comprising:
   maintaining a page table for a plurality of pages stored in a volatile memory, wherein the page table indicates, for each of the pages, whether the respective page is sourced from solid state memory, and whether the respective page is valid;
   generating a hibernation file that includes a set of the pages that are valid and not sourced from solid state memory;

invalidating, for each of the pages sourced from solid state memory, the validity of the respective page in the page table;

storing the page table with the hibernation file; and entering a hibernation mode that clears the volatile memory.

9. The method of claim 8, further comprising:

determining to restore the device from the hibernation mode;

reading the page table from the hibernation file; and placing each valid page from the hibernation file into the volatile memory.

* * * * *

UNITED STATES PATENT AND TRADEMARK OFFICE
CERTIFICATE OF CORRECTION

PATENT NO. : 9,507,709 B2  
APPLICATION NO. : 14/391226  
DATED : November 29, 2016  
INVENTOR(S) : Lee Warren Atkinson Page 1 of 1

It is certified that error appears in the above-identified patent and that said Letters Patent is hereby corrected as shown below:

In the Claims

In Column 10, Line 44, in Claim 6, delete "invalidate" and insert -- invalidate, --, therefor.

Signed and Sealed this  
Fourth Day of April, 2017

Michelle K. Lee  
*Director of the United States Patent and Trademark Office*